(12) United States Patent
Harrell

(10) Patent No.: US 7,941,289 B2
(45) Date of Patent: May 10, 2011

(54) FUEL DISPENSER CALIBRATION

(75) Inventor: Daniel C. Harrell, Round Rock, TX (US)

(73) Assignee: Dresser, Inc., Addison, TX (US)

( * ) Notice: Subject to any disclaimer, the term of this patent is extended or adjusted under 35 U.S.C. 154(b) by 179 days.

(21) Appl. No.: 11/963,480

(22) Filed: Dec. 21, 2007

(65) Prior Publication Data

US 2009/0164149 A1   Jun. 25, 2009

(51) Int. Cl.
*G01F 1/12* (2006.01)
(52) U.S. Cl. ........................................ 702/100
(58) Field of Classification Search .................. 702/100
See application file for complete search history.

(56) References Cited

U.S. PATENT DOCUMENTS

| | | | |
|---|---|---|---|
| 4,831,866 A * | 5/1989 | Forkert et al. | 73/1.27 |
| 4,969,365 A | 11/1990 | Strigard et al. | |
| 5,757,664 A | 5/1998 | Rogers et al. | |
| 6,401,045 B1 | 6/2002 | Rogers et al. | |
| 6,418,981 B1 * | 7/2002 | Nitecki et al. | 141/4 |
| 6,691,061 B1 * | 2/2004 | Rogers et al. | 702/156 |
| 6,909,986 B2 | 6/2005 | Rogers et al. | |
| 6,925,397 B2 | 8/2005 | Rogers et al. | |
| 6,934,644 B2 | 8/2005 | Rogers et al. | |
| 2003/0195653 A1 * | 10/2003 | Lewis et al. | 700/236 |
| 2004/0044497 A1 | 3/2004 | Rogers et al. | |
| 2004/0117135 A1 | 6/2004 | Rogers et al. | |
| 2004/0204999 A1 | 10/2004 | Negley, III et al. | |
| 2008/0295568 A1 * | 12/2008 | Nanaji et al. | 73/1.34 |

FOREIGN PATENT DOCUMENTS

| | | |
|---|---|---|
| EP | 1 143 388 | 10/2001 |
| GB | 2 384 326 | 7/2003 |
| WO | WO 2005/108281 | 11/2005 |

OTHER PUBLICATIONS

PCT International Search Report, PCT/US2006/044251, Apr. 26, 2007, pp. 1-4.
PCT Written Opinion of the International Searching Authority, Apr. 26, 2007, pp. 1-5.
U.S. Patent Application, Fuel Dispenser Management, Daniel C. Harrell, U.S. Appl. No. 11/559,211, Nov. 13, 2006, pp. 1-78.
PCT International Preliminary Report on Patentability, PCT/US2006/044251, May 22, 2008, pp. 1-7.

* cited by examiner

*Primary Examiner* — Aditya Bhat
(74) *Attorney, Agent, or Firm* — Fish & Richardson P.C.

(57) ABSTRACT

Systems and processes may provide calibration of a fuel dispenser. In particular implementations, fuel dispenser systems and processes may include the ability to determine whether a fuel delivery measurement of a fuel dispenser should be calibrated and adjust the fuel dispenser in response to the calibration.

28 Claims, 9 Drawing Sheets

FUEL DISPENSER CALIBRATION

TECHNICAL FIELD

This invention relates to fuel dispensers, and more particularly to fuel dispenser calibration.

BACKGROUND

The accuracy of fuel dispenser measurements of fuel delivery may decrease over time. Since inaccuracies in fuel dispenser measurements are commonly designed to favor consumers, fuel dispenser measurements may be calibrated to increase the accuracy of measurements and reduce loss due to inaccurate measurements for a retail fueling facility (e.g., a gas station). For example, a traditional retail fueling facility may sell many tens of thousands of gallons per month, and high volume retail fueling facilities may sell over one-hundred-thousand gallons per month. Thus, even small increases in the accuracy of measured fuel delivery may result in large savings for a retail fueling facility.

In many instances, representatives of a state weights and measures agency periodically visit retail fueling facilities to calibrate the facility's fuel dispensers. Calibration typically involves manually dispensing fuel from a fuel dispenser into a metered container and comparing the amount dispensed into the container to the amount the fuel dispenser indicates has been dispensed. Since calibration requires manually dispensing fuel from each fuel dispenser being calibrated into an external container, calibration is not frequently performed. Additionally, due to the large number of retail fueling facilities governed by an agency, the visits, and thus calibration, are infrequent.

While governmental regulations permit some level of inaccuracies, failure to satisfy the regulations may result in fuel dispensers and/or the retail fueling facility being closed until appropriate corrections are made. For example, some governmental regulations may require that the fuel dispensers at any given gas station not be off by more than one ounce for every five gallons. Thus, calibration may, of course, reduce lost revenue due to inaccurate measurements, and may also reduce lost revenue due to failure to comply with governmental regulations (e.g., fines, lost revenue from temporary closure, etc.).

SUMMARY

This disclosure relates to calibrating fuel dispensers. Calibration may be automatically achieved by a fuel dispenser itself or working in conjunction with fueling facility components.

In various systems and methods, a fuel dispenser may be automatically calibrated. In one general aspect, a self-calibrating fuel dispenser may include a fuel controller and a dispenser manager. The fuel controller may include one or more pumps that deliver fuel from one or more fuel reservoirs to a fuel delivery line and one or more meters that measure an amount of fuel delivered to the fuel delivery line. The dispenser manager may control fuel delivery by the fuel controller. The dispenser manager may also determine whether a fuel delivery measurement should be calibrated and adjust the fuel dispenser in response to the calibration.

Implementations may include one or more of the following features. In some implementations, the dispenser manager may adjust the measurement of the amount of fuel delivered by the fuel controller to adjust the fuel dispenser. The dispenser manager may determine whether a fuel dispenser should be calibrated by determining whether a triggering event has occurred (e.g., fuel controller delivers a predetermined amount of fuel, passage of a predetermined amount of time from a previous calibration, etc.). The dispenser manager may determine whether adjustment of the fuel dispenser is required in response to the calibration and adjust the fuel dispenser, if adjustment is required. The dispenser manager may obtain a calibration adjustment from a facility controller.

In some implementations, the fuel dispenser may include a calibration reservoir to facilitate calibration of the fuel dispenser. The calibration reservoir be coupled to the fuel controller and may receive fuel from the fuel delivery line during calibration. The amount of fuel delivered to the calibration reservoir during calibration may be compared (e.g., by the dispenser manager) to an amount of fuel measured by one or more of the meters during calibration. The dispenser manager may determine an adjustment to the fuel controller based on the comparison.

In some implementations, the dispenser manager may obtain a program update configured to decrease the deviation between an amount of delivered fuel measured by one or more meters and an actual amount of delivered fuel. The dispenser manager may adjust the fuel controller in response to the program update to adjust the fuel dispenser. The dispenser manager may obtain the program update from a remote system. The dispenser manager may receive a calibration adjustment from a facility controller.

In another general aspect, a process performed by a fuel dispenser may determine whether a fuel delivery measurement of the fuel dispenser should be calibrated and adjust the fuel dispenser in response to the calibration.

Various implementations may include one or more of the following features. Determining whether a fuel delivery measurement should be calibrated may include determining whether a triggering event has occurred. Adjusting the fuel dispenser may include adjusting the measurement of the amount of fuel delivered by a fuel controller.

In some implementations, the process may include delivering an amount of fuel to a calibration reservoir, measuring the amount of fuel delivered to the calibration reservoir using one or more meters, and comparing the amount of fuel delivered to the calibration reservoir to the measured amount of fuel. The fuel delivery measurement may be adjusted if the amount of fuel measured by one or more meters is not in a predetermined range of the amount of fuel delivered to the calibration reservoir during calibration.

In some implementations, the process includes obtaining a program update configured to decrease the deviation between the fuel delivery measurement and the actual amount of delivered fuel, and adjusting the fuel dispenser based at least partially on the program update. Adjusting the fuel dispenser based at least partially on the program update may include adjusting a fuel controller in response to the program update.

In some implementations, whether adjustment of the fuel dispenser is required in response to the calibration may be determined and the fuel dispenser may be adjusted, if adjustment is required. A calibration adjustment may be received from a facility controller.

In another general aspect, a fueling facility may be self-calibrating. A self-calibrating fueling facility may include one or more fuel reservoirs, one or more fuel dispensers, and a facility controller. Fuel dispensers may include one or more pumps, which may deliver fuel from fuel reservoirs to a fuel delivery line, and one or more meters, which may measure an amount of fuel delivered to the fuel delivery line. Fuel dispensers may also include a dispenser manager to control fuel delivery by pump(s). A facility controller may determine whether a fuel delivery measurement should be calibrated and adjust the fuel dispenser(s) in response to the calibration.

Implementations may include one or more of the following features. The fueling facility may include sensors coupled to one or more fuel reservoirs. The sensors may measure an amount of fuel in one or more of the fuel reservoirs. The facility controller may determine an amount of fuel in one or more of the fuel reservoirs. The facility controller may analyze the data from sensors coupled to one or more of the fuel reservoirs to determine an amount of fuel in one or more of the fuel reservoirs. The facility controller may perform a calibration. The facility controller may calibrate a fuel dispenser by measuring an amount of fuel in one or more of the fuel reservoirs before and after delivering the amount of fuel, determining an amount of fuel delivered from one or more of the fuel reservoirs to the fuel dispenser(s) based on the determined amounts of fuel in the fuel reservoir(s), comparing the measured amount of fuel delivered by the fuel dispenser(s) to the determined amount of fuel delivered, and determining if the fuel delivery measurement of at least one of the fuel dispensers should be adjusted based on the comparison. Determining an amount of fuel in one or more fuel reservoirs may include measuring an amount of fuel in the fuel reservoir(s) before and after delivering the amount of fuel.

Various implementations may include one or more features. For example, calibrated fuel dispensers may measure fuel delivered more accurately and/or facilitate identification of possible problems (e.g., leaks, broken or malfunctioning components of the fuel dispenser, etc.). Furthermore, an automatically calibrated fuel dispenser may be more cost-efficient to operate, since manual calibration of the fuel dispenser is not required and/or increasing the measuring accuracy of a fuel dispenser decreases losses due to inaccurate measurement of delivered fuel. A fuel dispenser operator may also benefit from intangible benefits such as improved reputation and goodwill, since the use of calibrated fuel dispensers may increase the trustworthiness of the operator in a consumer's mind.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

A number of systems and methods may provide a calibrated fuel dispenser. In various implementations, for example, a fuel dispenser, possibly in conjunction with the fueling facility, may calibrate its fuel delivery measurements through physical measurements and/or program updates.

Figure 1:
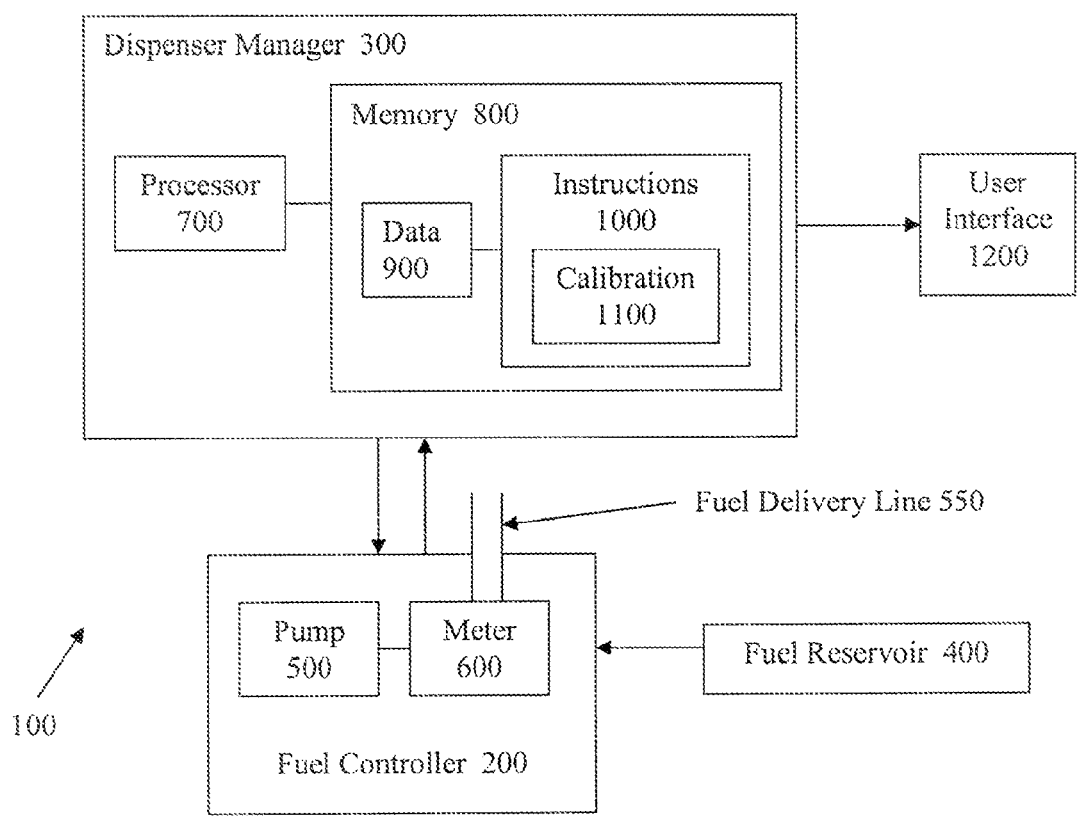
FIG. 1 is a block diagram illustrating one implementation of a self-calibrating fuel dispenser.

FIG. 1 illustrates one example of a self-calibrating fuel dispenser 100. Fuel dispenser 100 may deliver fuel to a vehicle, a storage tank, or any other appropriate container. The fuel dispenser may have a single or multiple hose configuration.

Fuel dispenser 100 includes a fuel controller 200 and a dispenser manager 300. Fuel controller 200 may control the delivery of fuel. Dispenser manager 300 may manage control of the electronic functions of fuel dispenser 100. Dispenser manager 300 may be implemented in software and/or hardware.

Fuel controller 200 of fuel dispenser 100 is coupled to a fuel reservoir 400, which is capable of containing fuel. Fuel reservoir 400 may include one or more containers. For example, a fuel reservoir may include underground containers that retain fuel until needed. A fuel reservoir may also supply fuel to more than one fuel dispenser. In one implementation, fuel reservoir 400 may include at least one container for each different type and/or grade of fuel available (e.g., ultra premium, premium, regular, unleaded, and diesel). A fuel reservoir may be kept at or above a predetermined pressure to reduce volatility of the fuel in the fuel reservoir.

Fuel controller 200 includes a pump 500 and a meter 600. In some implementations, fuel controller 200 may include one or more pumps 500 and/or one or more meters 600, which may be coupled to a fuel reservoir 400 directly or indirectly. A pump may include any device capable of moving fluids. In one implementation, a pump may be selected that is capable of transferring volatile fluids such as gasoline. Pump 500 may transfer fuel from fuel reservoir 400 to a fuel delivery line 550. Fuel delivery line 550 may transfer fuel to and/or between one or more fuel pumps, one or more calibration reservoirs, to a dispensing nozzle, and/or one or more other locations coupled to the pump. A fuel delivery line may be kept at or above a predetermined pressure to reduce the volatility of the fuel in the fuel delivery line and/or inhibit two phase flow in the fuel delivery line.

Meter 600 measures an amount of fuel delivered (i.e., a fuel delivery measurement). In the illustrated implementation, meter 600 is coupled to the fuel delivery line 550 to measure fuel delivered by fuel controller 200 through the fuel delivery line. A meter may be any type of measuring device including, but not limited to a volume flow meter, or a mass flow meter. For example, a meter may be a venturi flow meter, an orifice flow meter, or a magnetic flow meter. A meter may also be electronic. A meter may operate by inline or offline techniques. A meter may be capable of transmitting digital or analog results to a fuel controller and/or a dispenser manager.

Dispenser manager 300 may manage the electronic functions of fuel dispenser 100 including, but not limited to, the management of fuel controller 200. For example, dispenser manager 300 may adjust the amount of fuel delivered by fuel controller 200 and/or measurements of the amount of fuel delivered by the fuel controller. The dispenser manager may control fuel delivery by pump 500 of fuel dispenser 100.

Dispenser manager 300 includes a processor 700 coupled to a memory 800. Processor 700 may include a microcontroller, a microprocessor, and/or any other type of device capable of manipulating information in a logical manner. Memory 800 may include RAM, ROM, optical disks, magnetic storage, flash memory, and/or any type of device capable of storing information. Memory 800 stores data 900 and instructions 1000 which facilitate the operation of the fuel dispenser. Data 900 may include date of last calibration, amount of fuel dispensed since last calibration, and/or amount of fuel dispensed in current transaction. Instructions 1000 include calibration instructions 1100. Instructions 1000 may also include operating instructions. Calibration instructions 1100 may include, but are not limited to, business, industry, or empirical rules to facilitate determining whether fuel dispenser 100 requires calibration, the required accuracy of the fuel dispenser, how to determine an adjustment to the fuel dispenser when needed, what components of the fuel dispenser to adjust for calibration, and/or how to calibrate the fuel dispenser.

Dispenser manager 300 may be coupled to a user interface 1200, such as one or more displays or keypads. Dispenser manager 300 may receive input from user interface 1200 and/or may control the content on the user interface. User interface 1200 may facilitate interaction with a user of the fuel dispenser (e.g., a customer pumping fuel into a car).

In one mode of operation, fuel dispenser 100 may determine whether a fuel delivery measurement of the fuel dispenser should be calibrated. A self-calibrating fuel dispenser may be more cost-efficient to operate, since manual calibration of the fuel delivery measurement is not required and/or increasing the measuring accuracy of a fuel dispenser decreases losses due to inaccurate measurement of delivered fuel. An operator may also benefit from intangible benefits such as improved reputation and goodwill, since the use of self-calibrating fuel dispensers may increase the trustworthiness of the operator in a consumer's mind.

The fuel delivery measurement may be obtained from one or more or meters coupled to the fuel delivery line. If the fuel delivery measurement should be calibrated, the fuel dispenser may determine whether adjustment to the fuel delivery measurement is required. For example, if the deviation between the fuel delivery measurement and an actual amount of fuel delivered is not within a predetermined range, adjustment may be required. In addition, if a program update is available, adjustment to the fuel delivery measurement may be required.

If adjustment to the fuel delivery measurement is required, the fuel dispenser may adjust the fuel delivery measurement. For example, the fuel dispenser may adjust one or more meters coupled to the fuel delivery line. The fuel dispenser may also implement a program update to adjust a fuel delivery measurement. A self-calibrating fuel dispenser may also facilitate identification of possible problems (e.g., leaks or broken or malfunctioning components of the fuel dispenser). For example, if after adjusting the fuel delivery measurement, the fuel dispenser recalibrates and the fuel delivery measurement is still not within a predetermined range, this may indicate the presence of a leak or malfunctioning equipment. In addition, continuous recalibration or large adjustments may indicate a problem.

Figure 2:
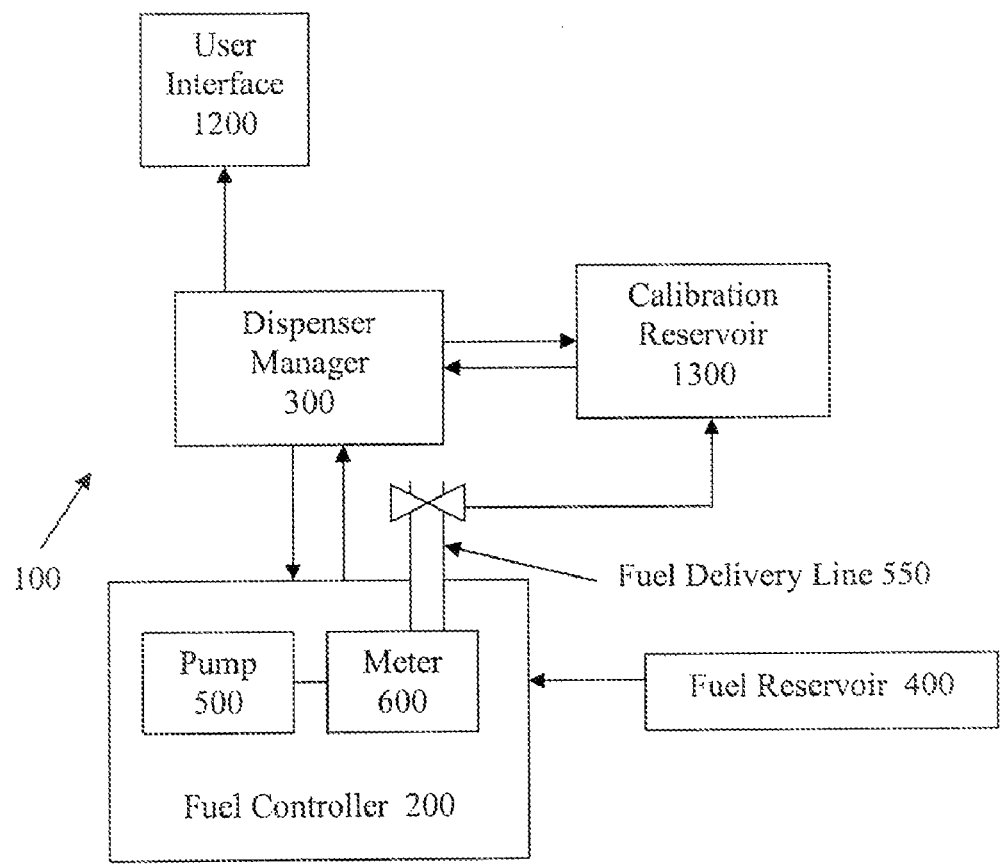
FIG. 2 is a block diagram illustrating another implementation of a self-calibrating fuel dispenser.

FIG. 2 illustrates an implementation in which fuel dispenser 100 includes a calibration reservoir 1300. Fuel may be transferred from fuel reservoir 400 to calibration reservoir 1300 via one or more fuel delivery lines 550. A valve on a fuel delivery line may direct the flow of fuel into the calibration reservoir and/or inhibit fuel from flowing into the calibration reservoir. Calibration reservoir 1300 may be capable of containing a predetermined amount (e.g., volume or weight) of fuel. For example, the calibration reservoir may be a 1-gallon, or possibly smaller, container. The calibration reservoir may be approved by a standards board. In operation, the fuel flow to calibration reservoir 1300 may stop when a predetermined amount of fuel has been transferred to the calibration reservoir. For example, when a predetermined volume or weight of fuel has been transferred to calibration reservoir 1300, dispenser manager 300 and/or fuel controller 200 may stop fuel flow to the calibration reservoir.

Figure 3:
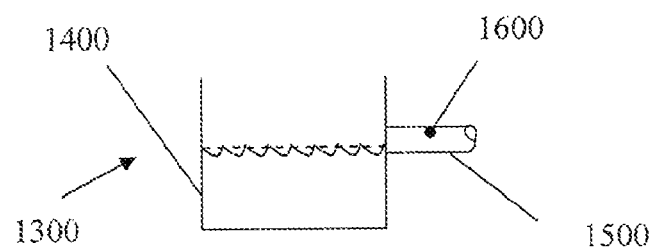
FIG. 3 is a line drawing illustrating an implementation of a calibration reservoir.

FIG. 3 illustrates one implementation of calibration reservoir 1300. Calibration reservoir 1300 includes a chamber 1400 and a channel 1500 so that the container can be filled to a particular amount. Fuel controller 200 may deliver fuel to chamber 1400 of calibration reservoir 1300 until the fuel reaches a level at which the fuel flows into one or more channels 1500 coupled to the chamber. A sensor 1600 in channel 1500 may detect fuel in the channel and transmit a signal to fuel controller 200 and/or dispenser manager 300 that a predetermined amount of fuel has been delivered to calibration reservoir 1300. In other implementations, a chamber may include sensors in one or more walls of the chamber and transmit a signal to the fuel controller and/or dispenser manager that a predetermined amount of fuel is in the chamber.

In some implementations, the calibration reservoir may be coupled to a scale. The scale may be capable of determining the weight of fuel in the calibration reservoir. From the weight of fuel, an actual volume of fuel delivered may be determined. For example, the dispenser manager may allow the fuel controller to deliver a predetermined amount of fuel to the calibration reservoir (e.g., 1 gallon of fuel as measured by the meter). The scale determines the weight of the fuel in the calibration reservoir, and an actual volume of fuel may be determined. In another example, fuel may be transferred to the calibration reservoir until a predetermined amount (weight or volume determined from the weight) of fuel is contained in the calibration reservoir. Then fuel flow is terminated, and the fuel delivery measurement (e.g., as measured by the meters) is determined.

The calibration reservoir may include temperature sensors and/or pressure sensors. Since fuel may evaporate at atmospheric pressure, it may be necessary to adjust fuel delivery measurements and/or analysis used to determine actual amounts of fuel delivered to account for temperature and/or pressure differences from a reference or average temperature or pressure.

Figure 4:
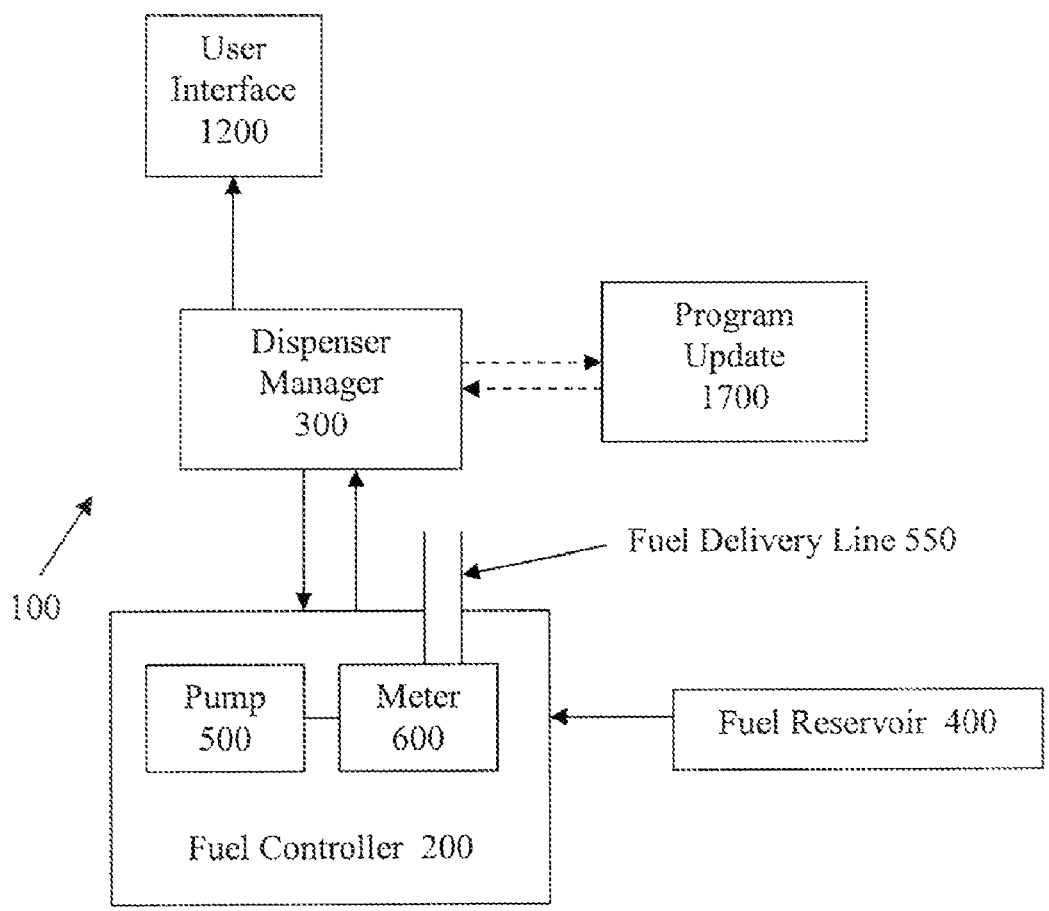
FIG. 4 is a block diagram illustrating an implementation of a self-calibrating fuel dispenser.

FIG. 4 illustrates another implementation of fuel dispenser 100. In this implementation, dispenser manager 300 may obtain a program update 1700 for calibrating the fuel delivery measurements. A program update may include data and/or instructions regarding fuel delivery measurements. Program update 1700 may decrease the deviation between the fuel delivery measurement (e.g., the measured amount of fuel delivered) and the actual amount of fuel delivered. Program update 1700 may be at least partially based on historical data of deviations, models, industry standards, and/or government standards. Program update 1700 may update and/or adjust the output one or more meters 600 to increase accuracy of measurements. In some implementations, program update 1700 may update and/or adjust dispenser manager 300 and/or fuel controller 200 to adjust measurements of fuel delivered. For example, the program update may provide an adjustment so that when the dispenser manager receives a measurement from a meter, the adjustment alters the measurement to decrease the deviation between the actual amount of fuel dispensed and the fuel delivery measurement. The program update may also adjust the fuel controller so that readings from a meter are adjusted to provide a more accurate fuel delivery measurement and/or so that fuel dispensed from the fuel dispenser more accurately reflects the fuel delivery measurement.

In some implementations, dispenser manager 300 may obtain or retrieve program update 1700 from a memory coupled to the dispenser manager. For example, at least a portion of program update 1700 may be stored in a memory of fuel dispenser 100. As another example, at least a portion of the program update 1700 may be stored in a memory accessible by the dispenser manager. A dispenser manager may transmit a request for a program update to a remote system and be capable of receiving the program update from the remote system. The dispenser manager may request a program update from a remote system via one or more communication protocols (e.g., TCP/IP). For example, dispenser manager 300 may request and/or receive a program update of a calibration adjustment from a facility controller.

In operation, a self-calibrating fuel dispenser such as fuel dispenser 100, may determine if a calibration of the fuel dispenser is required. For example, it may be desirable to calibrate a fuel dispenser to comply with government regulations, to correct inaccurate measuring, and/or to increase profits. In some implementations, it may be desirable to calibrate a fuel dispenser after a particular event, such as a triggering event. In particular implementations, the occurrence of a particular event, such as a triggering event, may be associated with a decrease in the accuracy of measuring fuel delivered and thus indicate a need to calibrate a fuel dispenser. For example, a triggering event such as replacing a valve may associated with decreased measuring accuracy, and thus, calibration may be required. As another example, a triggering event may include the passage of time, since fuel dispensers may develop leaks over time or with usage and/or the accuracy of meters may decrease over time or with usage.

A triggering event may include any event after which business rules, past experience, industry standards, or government standards determines that a calibration would be desirable. Triggering events may include, but are not limited to, a period of time passing (e.g., a predetermined period of time passing after the previous calibration or a predetermined period of time passing after a component is replaced); a predetermined amount of fuel being dispensed by the fuel dispenser (e.g., 50,000 gallons); a request for calibration from an external source (e.g., a store operator, a government regulator, or a franchiser, whether remotely or locally, may request calibration or push a button); fuel reservoirs being refilled; repair or replacement of a component of the fuel dispenser; ambient temperature changes (e.g., when the temperature changes 25 degrees), and/or any combination thereof.

A fuel dispenser may periodically or continuously determine if calibration of the fuel dispenser is required. For example, the fuel dispenser may determine if a calibration of a fuel dispenser is required once a day, a week, or a month. As illustrated in FIG. 1, calibration instructions 1100 stored at least partially in memory 800 of dispenser manager 300 may be accessed and implemented to determine if calibration is required. Fuel dispensers may also determine if calibration is required on an event-driven basis (e.g., if a triggering event occurs, then the fuel dispenser determines if calibration is required).

Figure 5:
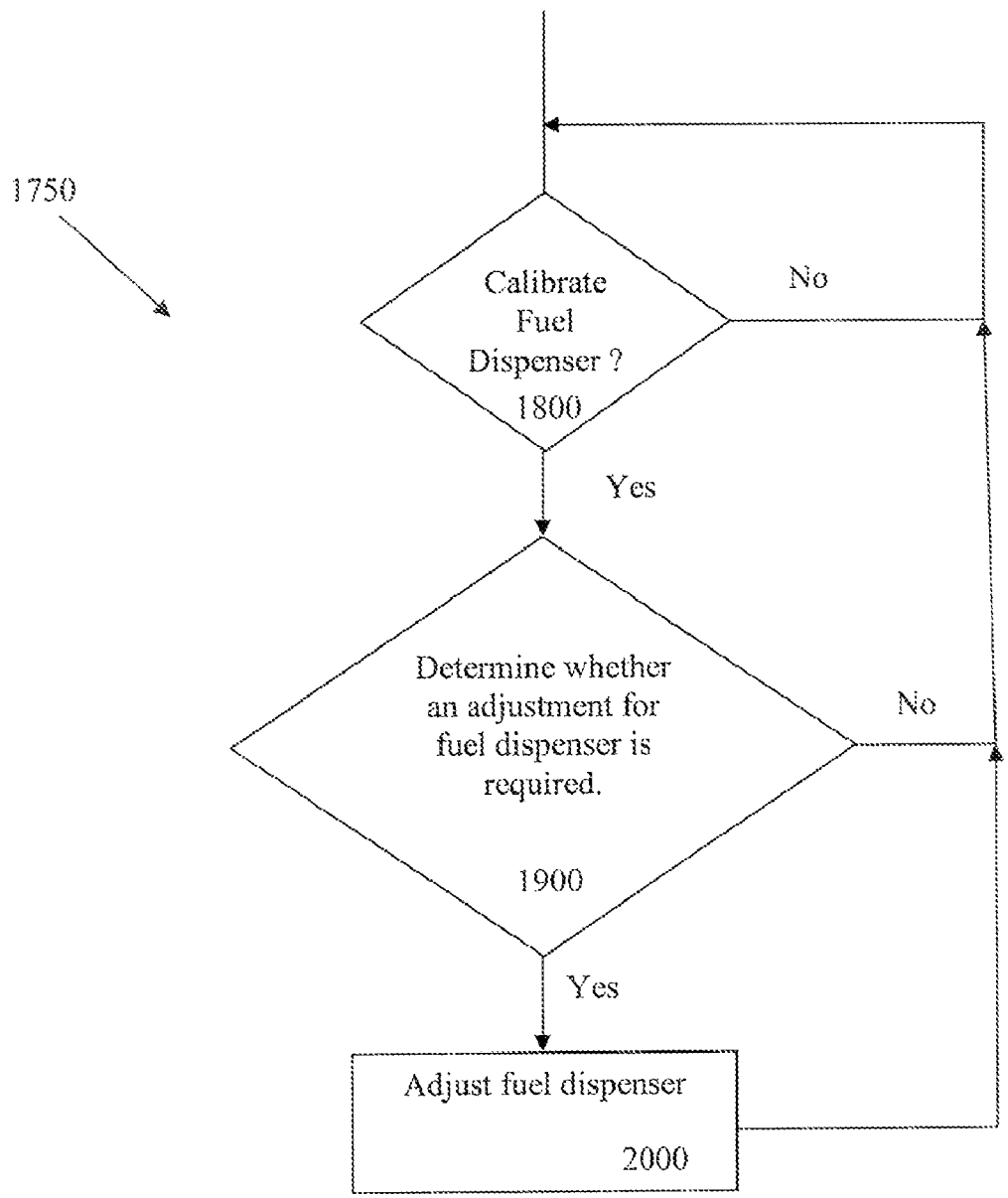
FIG. 5 is a flow chart illustrating an implementation of a calibration process performed by a fuel dispenser.

FIG. 5 illustrates an implementation of a calibration process 1750 performed by a fuel dispenser. Process 1750 may represent a mode of operation of fuel dispenser 100, for example.

In process 1750, the fuel dispenser may determine whether to calibrate itself (operation 1800). For example, if a triggering event has occurred or a command from a facility controller is received, the fuel dispenser may determine that calibration is required. If the fuel dispenser determines that calibration is not required, then the fuel dispenser may determine, perhaps after waiting for a period of time or event, whether to calibrate itself (operation 1800). If the fuel dispenser determines calibration is required, the fuel dispenser may determine if adjustment to the fuel dispenser is required (operation 1900). For example, if a fuel delivery measurement is within a predetermined range of actual amount of fuel delivered or if a more current program update is not available, then adjustment may not be required. If the fuel dispenser determines adjustment to the fuel dispenser is not required, the fuel dispenser may again determine whether to calibrate itself (operation 1800).

If, however, the fuel dispenser determines that adjustment is required, the fuel dispenser adjusts itself (operation 2000). For example, adjusting the fuel dispenser may include adjusting a meter coupled to the fuel delivery line. A meter of the fuel dispenser may be adjusted by the dispenser manager. As an example, a dispenser manager of the fuel dispenser may receive a calibration adjustment from a facility controller. As another example, a dispenser manager may determine the adjustment required and adjust the fuel dispenser as required. After the fuel dispenser is adjusted, the fuel dispenser may determine whether to calibrate itself.

Although process 1750 is described in a specific order, the operations can be performed in other orders and some operations may be added or deleted. For example, the fuel dispenser may not determine if adjustment to the fuel delivery measurement is required. The fuel dispenser may adjust the fuel delivery measurement if calibration is required. In another example, the fuel dispenser may determine the adjustment to the fuel delivery measurement.

Figure 6:
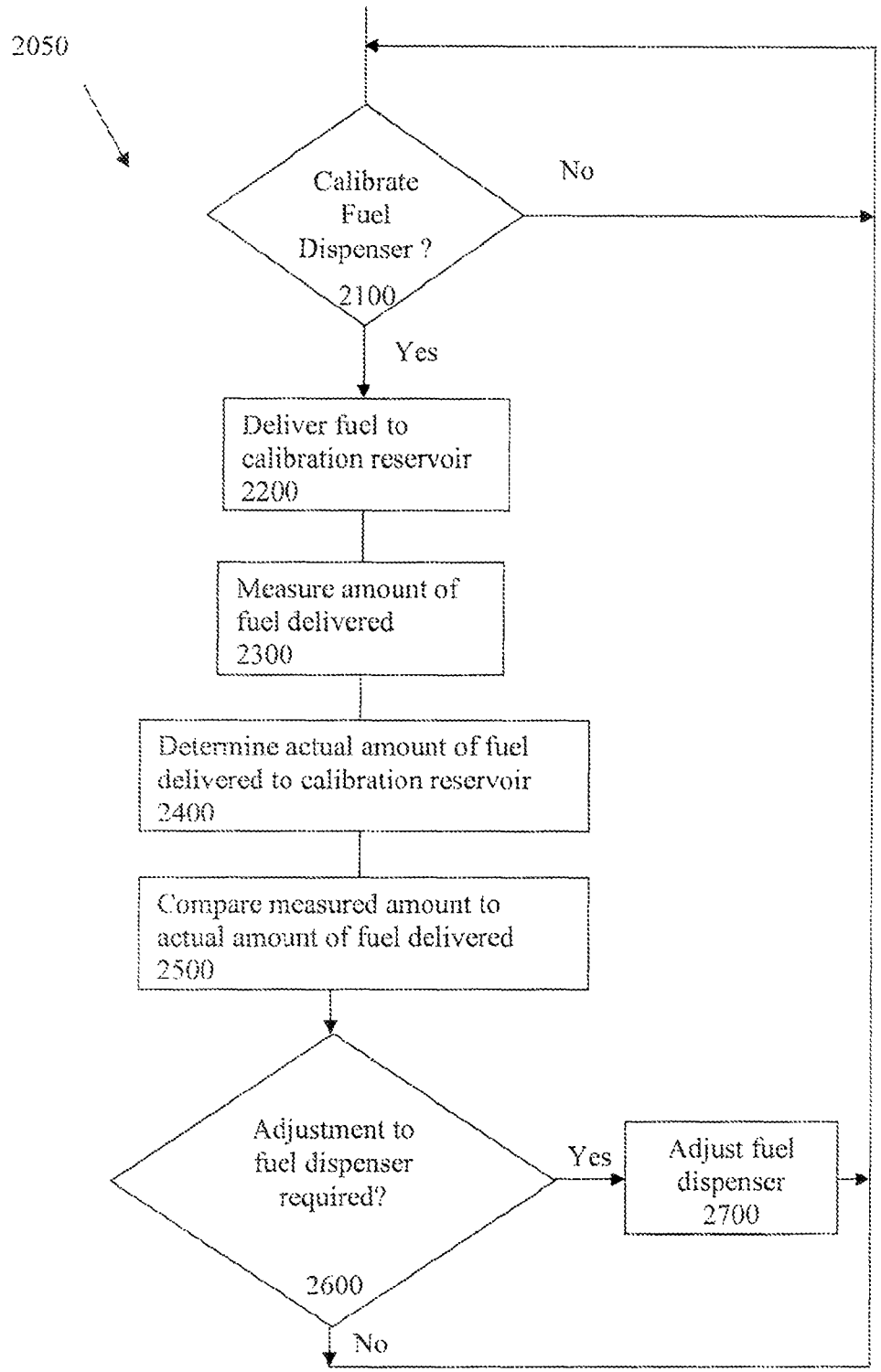
FIG. 6 is a flow chart illustrating one implementation of a calibration process performed by a fuel dispenser.

FIG. 6 illustrates an implementation of a calibration process 2050 performed by a fuel dispenser that includes a calibration reservoir. In process 2050, the fuel dispenser may determine whether it needs to be calibrated (operation 2100). For example, if a triggering event has occurred (e.g., passage of a predetermined amount of time), the fuel dispenser may determine that calibration is required. A dispenser manager may also determine that a triggering event has occurred when it receives a message that to calibrate itself. If a fuel dispenser does not need to be calibrated, the fuel dispenser may again determine whether to calibrate itself. If the fuel dispenser needs to be calibrated, fuel may be delivered to the calibration reservoir (operation 2200). In one implementation, a predetermined amount of fuel is delivered via one or more pumps from a fuel reservoir to the calibration reservoir. The amount of fuel delivered to the calibration reservoir may be measured, for example, by one or more meters coupled to the pumps (operation 2300). The actual amount of fuel delivered to the calibration reservoir is also determined (operation 2400). The actual amount of fuel delivered may be fixed (e.g., when a calibration reservoir holds a specific amount) or variable. If the amount of fuel delivered is variable, the actual amount of fuel delivered may be obtained, for example, by determining the volume or weight of fuel in the calibration reservoir. In one implementation, the ambient temperature may be determined, and the temperature may facilitate determining the actual amount of fuel delivered.

The measured amount of fuel is compared to the actual amount of fuel delivered (operation 2500). A determination is made whether adjustment of the fuel dispenser is required (operation 2600). If the measured amount of fuel is not equal, or nearly equal, to the actual amount of fuel delivered, adjustment of the fuel dispenser (e.g., fuel delivery measurement, meters, etc.) may be required. In one implementation, if the deviation of measured amount of fuel from the actual amount delivered is within a predetermined range, adjustment to the fuel delivery measurement may not be required. A predetermined range for the deviation may be based at least partially on government regulations, industry standards or regulations, and/or business rules.

If adjustment to the fuel delivery measurement is not required, the fuel dispenser may again determine whether to calibrate itself. If adjustment to the fuel dispenser is required, the fuel dispenser may adjust the itself (operation 2700). The adjustment to the fuel dispenser may be determined by the fuel dispenser and/or obtained from a remote system. For example, instructions on how to adjust the fuel delivery measurement of a fuel dispenser may be stored in a memory. A fuel delivery measurement may be adjusted by adjusting a dispenser manager, a fuel controller, and/or one or more meters. For example, a meter may be adjusted to increase the accuracy of the measurements.

Although process 2050 is described in a specific order, the operations can be performed in other orders and some operations may be added or deleted. For example, the actual amount of fuel delivered to the calibration reservoir may be fixed and thus, the actual amount of fuel may not be determined. As another example, the deviation between the fuel delivery measurement and the actual amount of fuel delivered to the calibration reservoir may be compared to a predetermined range of allowable deviation.

Figure 7:
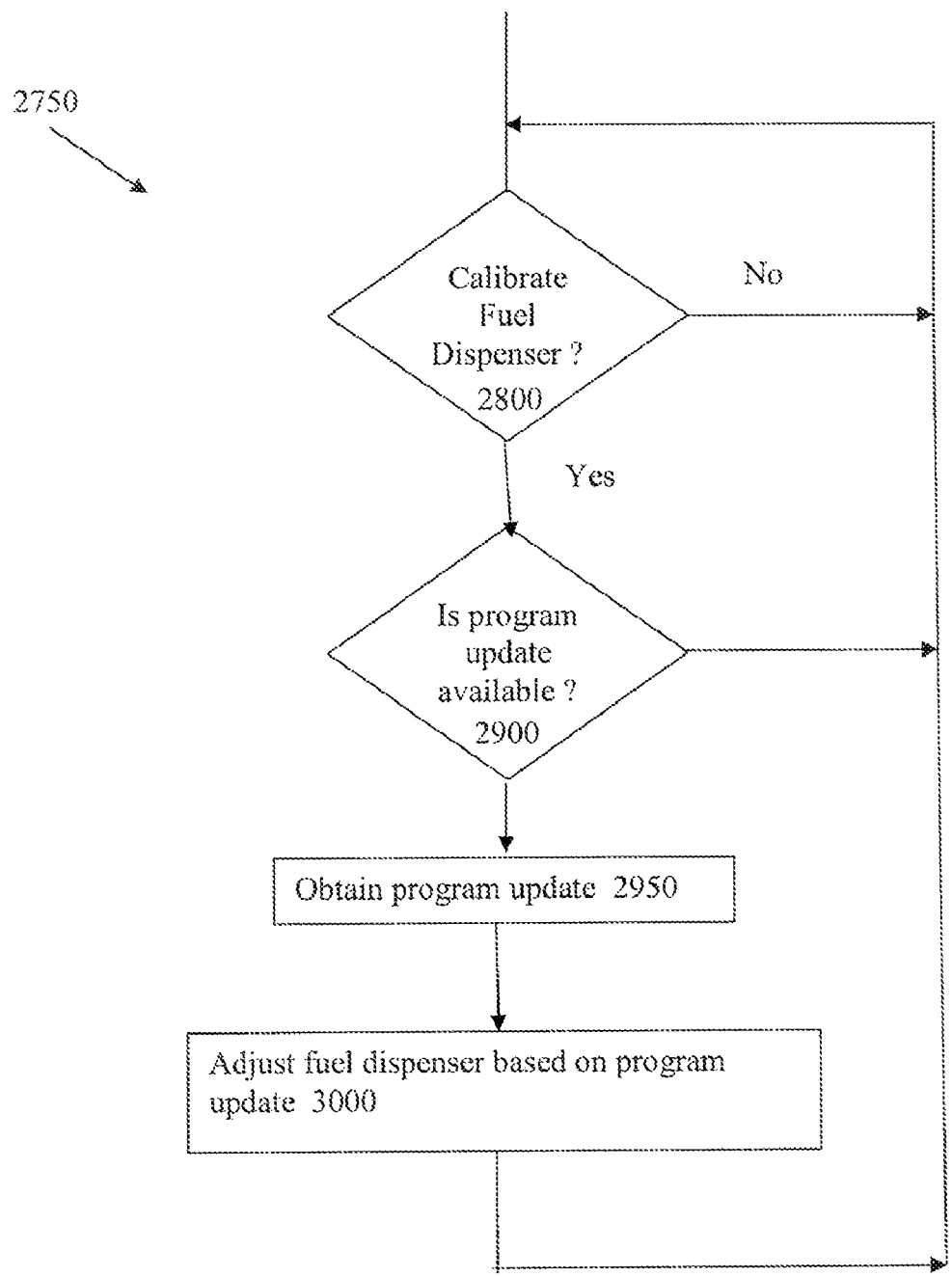
FIG. 7 is a flow chart illustrating another implementation of a calibration process performed by a fuel dispenser able to implement a program update.

FIG. 7 illustrates an implementation of a process 2750 for calibration performed by a fuel dispenser that implements a program update. In process 2750, the fuel dispenser may determine whether to calibrate itself (operation 2800). For example, if a triggering event has occurred (e.g., if a fuel dispenser dispenses a predetermined amount of fuel), the fuel dispenser may calibrate itself. If calibration of the fuel dispenser is not required, the fuel dispenser may again determine whether to calibrate itself.

If the fuel dispenser needs to be calibrated, a determination may be made whether a program update is available (operation 2900). For example, a version number, creation date, file size, file name, and/or other indicators may be analyzed to determine if the program update is different and/or more current that the last program update obtained by the fuel dispenser. If a program update is not available, then the fuel dispenser may again determine whether to calibrate itself (operation 2800).

If a program update is available, the program update may be obtained (operation 2950). The program update may decrease the deviation between a fuel delivery measurement and an actual amount of fuel measured. For example, if a pulse based meter is used in a fuel dispenser, the program update may adjust the value of pulses (e.g., 1701 pulses per gallon may be adjusted to 1697 pulses per gallon). The program update may be obtained from a memory coupled directly or remotely to the dispenser manger.

The fuel dispenser may then be adjusted based on the program update (operation 3000). For example, the program update may be implemented in a dispenser manager, a fuel controller, or one or more meters. In some implementations, a dispenser manager may adjust measurements of the amount of fuel delivered by a fuel controller and/or amounts of fuel delivered by the fuel controller to adjust the fuel controller based on the program update. After the fuel delivery measurement is modified, the fuel dispenser may determine whether to calibrate itself (operation 2800).

Although process 2750 includes specific operations, additional operations may be added or deleted. For example, the dispenser manager may also verify the program update is new (e.g., compare the date of the program update to the last calibration date). The dispenser manager may validate the program update. The dispenser manager may determine if adjustment is required (e.g., determine time lapsed since last program update, determine amount of fuel dispensed, determine number of sales, etc.).

In some implementations, a fuel dispenser may include a calibration reservoir and be capable of obtaining a program update. In these implementations, a fuel dispenser may determine whether calibration is required. If calibration is required, the fuel dispenser may deliver fuel to a calibration reservoir and/or obtain a program update. For example, if fuel is delivered to a calibration reservoir, the measured amount of fuel delivered to the calibration reservoir may be compared to the actual amount of fuel delivered to the fuel reservoir. If the measured amount of fuel is not in a predetermined range of the actual amount of fuel delivered to the calibration reservoir, the dispenser manager may obtain a program update. The program update may be implemented by the dispenser manager to adjust the fuel delivery measurement. In one implementation, after the fuel delivery measurement has been adjusted, the fuel dispenser may be recalibrated to determine if the adjustment was sufficient (e.g., the measured amount of fuel is in a predetermined range of the actual amount of fuel delivered to the calibration reservoir).

In another implementation, the fuel dispenser may calibrate using the calibration reservoir and/or a program update when specified triggering events occur. For example, a fuel dispenser may calibrate using the calibration reservoir when calibrating in response to the triggering event being dispensing a predetermined amount of fuel or replacing a gasket in the fuel dispenser. In another example, the fuel dispenser may calibrate by obtaining a program update when calibrating in response to the triggering event being passage of a predetermined amount of time since the previous calibration or receiving a command from a store operator.

Figure 8:
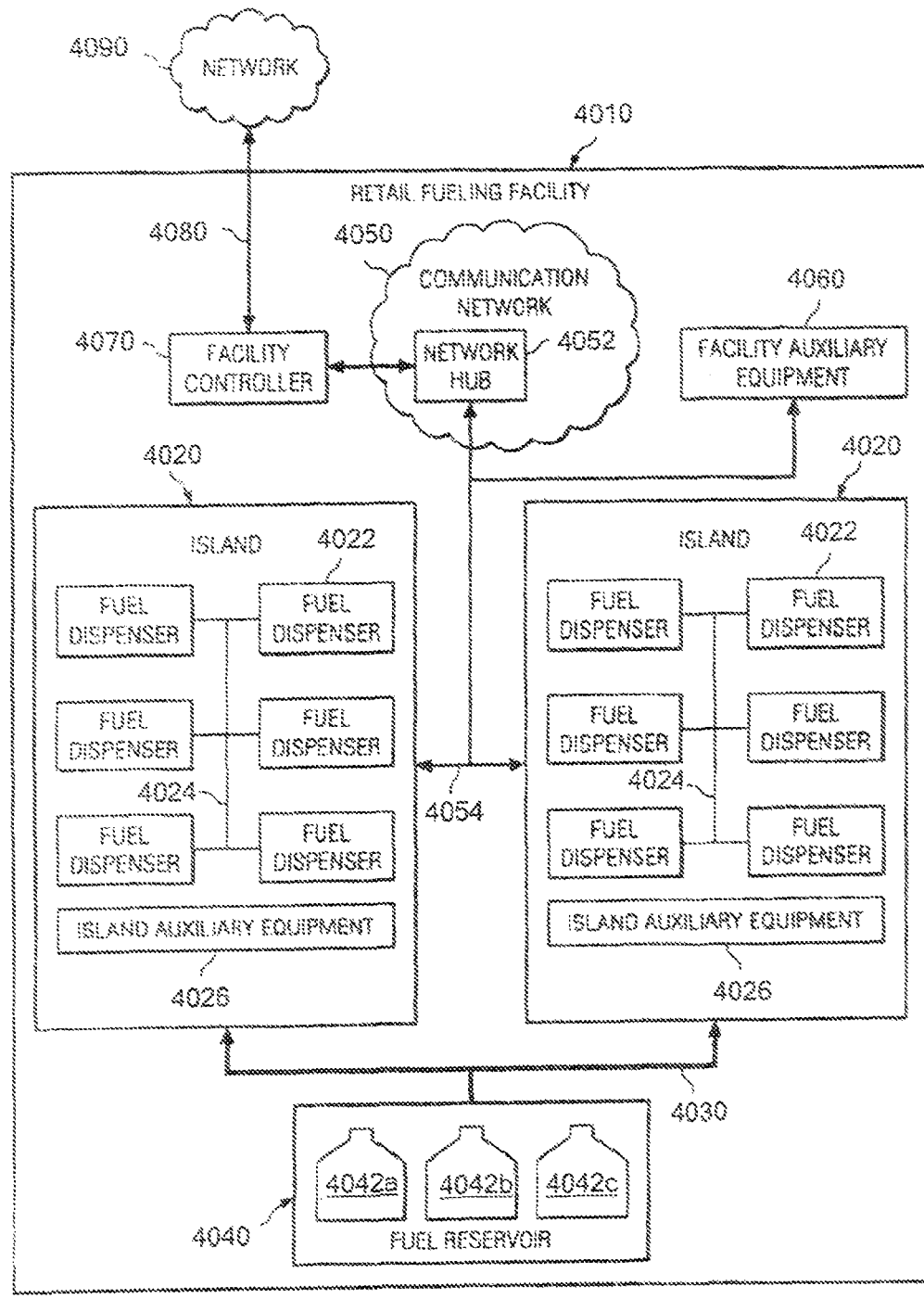
FIG. 8 is a block diagram illustrating an implementation of a retail fueling facility.

A fuel dispenser such as fuel dispenser 100 may be part of a retail fuel facility. FIG. 8 illustrates a retail fueling facility 4010 that includes fuel dispensers 4022, one or more of which may be similar to fuel dispenser 100. Retail fueling facility 4010 includes one or more islands 4020. More than one fuel dispenser 4022 may be positioned at islands 4020. For example, as illustrated in FIG. 8, islands 4020 include six fuel dispensers 4022.

Fuel dispensers 4022 may be coupled to fuel reservoir 4040 via one or more fuel lines 4030. Fuel reservoir 4040 may include at least one container 4042$a$, 4042$b$, 4042$c$ for each type or grade of fuel (e.g., diesel, regular unleaded, premium unleaded) available at the retail fueling facility. Each fuel dispenser 4022 may dispense more than one type of fuel (e.g., gasoline or petrol, diesel, liquid propane, and/or ethanol) from the fuel reservoir 4040. Although FIG. 8 illustrates a two island retail fueling facility with six fuel dispensers on each island, the number and arrangement of particular islands, fuel dispensers, fuel reservoirs and/or containers may be varied or otherwise adapted for specific implementations.

Fuel dispenser 4022 may include one or more communication links 4024, 4054 that allow communication with other fuel dispensers and/or remote systems. For example, a dispenser manager of fuel dispenser 4022 may obtain a program update from other fuel dispensers and/or remote systems via communication links 4024, 4054. Communication links 4024, 4054 may include any suitable combination of physical or nonphysical links that provide a path for transporting information. Communication links 4024, 4054 may be wired (e.g., unshielded twisted pair (UTP), coaxial cable, fiber optic) and/or wireless (e.g., RF or IR). Communication links 4024, 4054 may use any suitable standard or proprietary communications protocols and interfaces (e.g., TCP/IP, Bluetooth, wireless local area network, controller area network, RS-485, RS-232, universal serial bus, or Ethernet).

Communication link 4054 may be coupled to a communication network 4050, which includes a network hub 4052, and facility auxiliary equipment 4060. Communication network 4050 may be directly or remotely coupled to fuel dispensers 4022. Network hub 4052 may provide message distribution services, for example, messages sent in packets or frames over communication links 4024, 4054. Islands 4020 and/or fuel dispensers 4022 may be arranged in a hub and spoke structure around network hub 4052 or arranged in a ring, hierarchical, or daisy chain network, or other appropriate configurations. Communication link 4054 also may convey messages, such as commands, data, program updates, or control signals, between network hub 4052 or the islands 4020 and facility auxiliary equipment 4060.

Facility or island auxiliary equipment 4060, 4026 (e.g., communication equipment such as an intercom; audio and/or video recording or playback systems; and/or diagnostic equipment such as fuel spill detectors, emergency fuel shut-off controls, theft deterrent systems, surveillance equipment, lighting, and proximity detection equipment) coupled to fuel dispensers 4022 may support functionality for the retail fueling facility. Facility and/or island auxiliary equipment 4060, 4026 may be controlled by one or more fuel dispensers 4022.

In some implementations, network hub 4052 may distribute messages from facility controller 4070. Facility controller 4070 may include a computing system, such as a client connected to a remote server (not shown) through communication link 4080 coupled to communication network 4090 that is external to the retail fueling facility 4010. Facility controller 4070 may coordinate and/or manage more than one fuel dispenser 4022.

In some implementations, messages from facility controller 4070 may include program instructions (e.g., configuring fuel dispensers to operate in a certain manner, calibration commands or instructions, or program updates) or information such as control signals or data. The program instructions may be stored in a fuel dispenser, as depicted in FIG. 1. In some implementations, fuel dispensers 4022 may execute program instructions without substantial additional information from facility controller 4070. Facility controller 4070 may receive messages such as, but not limited to, status data, requests for maintenance, requests for program updates, and/or data such as quantity of fuel dispensed or data from fuel dispensers 4022 via network hub 4052. Data may be transferred between facility controller 4070 and fuel dispensers 4022 during use and/or when fuel dispensers 4022 are not in use. Data may be transferred in real-time, continuously, and/or at predetermined intervals.

Figure 9:
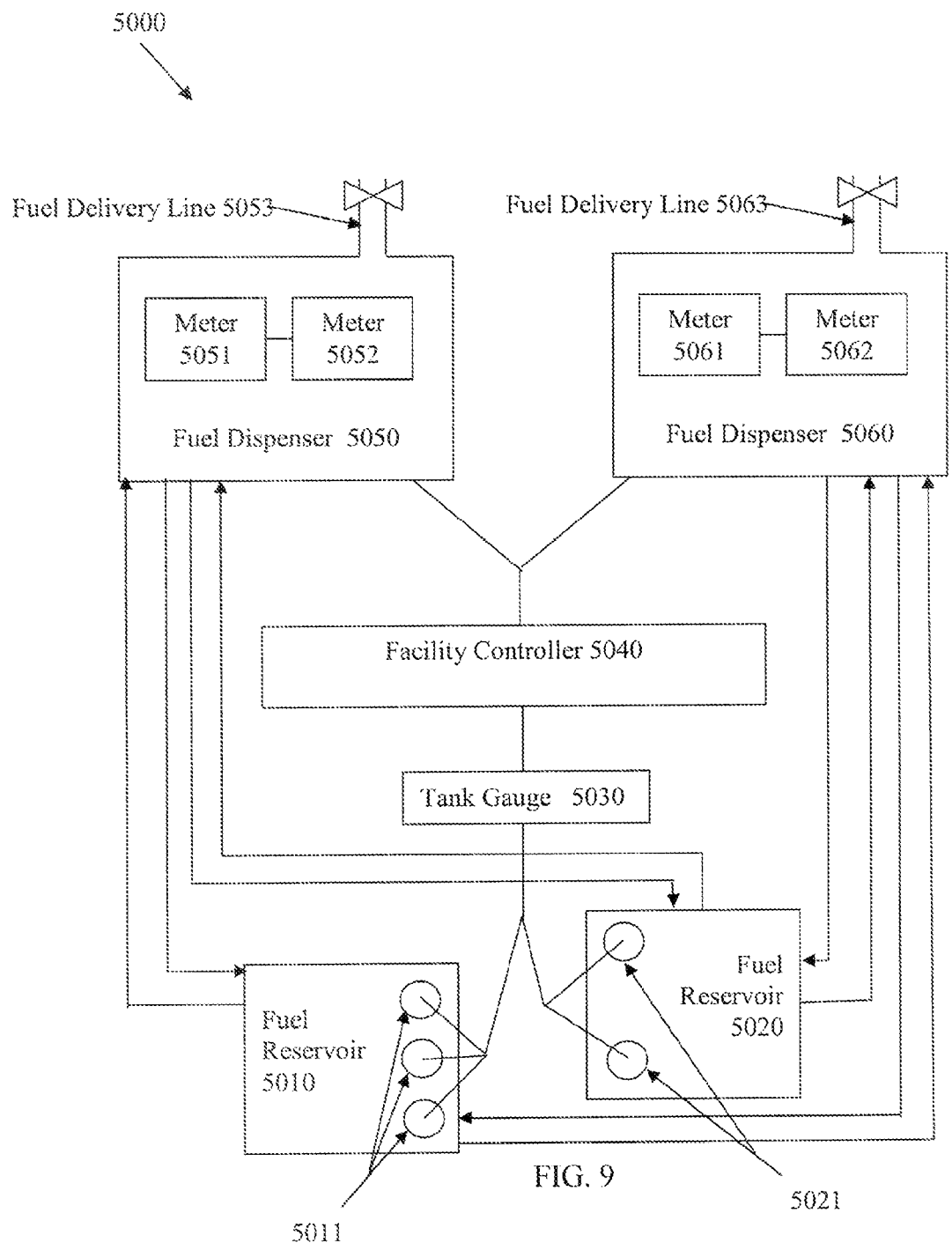
FIG. 9 is a block diagram illustrating another implementation of a retail fueling facility.

FIG. 9 illustrates another implementation of a fueling facility 5000. Fueling facility 5000 includes fuel dispensers 5050, 5060 and fuel reservoirs 5010, 5020. Each fuel reservoir 5010, 5020 may contain a different grade or type of fuel (e.g., premium, regular unleaded, diesel, etc.). Fuel reservoir 5010 may contain regular unleaded fuel and fuel reservoir may contain premium unleaded fuel. A mid-grade fuel may be dispensed through fuel dispenser 5050, 5060 by dispensing or mixing fuel from fuel reservoir A 5010 and fuel reservoir B 5060. In some implementations, a fuel dispenser may include a meter coupled to a conduit by which fuel is delivered from a fuel reservoir. Thus, meter 5051, 5052, 5061, 5062 may measure fuel delivered from one of the fuel reservoirs 5010, 5020 to the fuel delivery line 5053, 5063.

A tank gauge 5030 may be coupled to sensors 5011, 5021 to measure an amount of fuel in fuel reservoirs 5010, 5020. For example, sensors 5011, 5021 may measure a fuel level in fuel reservoirs 5010, 5020, and an amount of fuel may be determined based on the fuel level of the fuel reservoirs. Sensors 5011, 502 may be magnetoresistive sensors, float or buoyancy switches, ultrasonic sensors, piezo-resonant sensors, electro-optic sensors, load cells, or any other appropriate sensor.

Tank gauge 5030 may transmit measurements from sensors 5011, 5021 to a facility controller 5040. Facility controller 5040 may determine an amount of fuel in a fuel reservoir based on the measurements from the sensors 5011, 5021. For example, if a container has a fixed volume, the fuel level may be used to determine a volume of fuel in the container. As another example, sensors such as load cells may be used to determine a weight of a fuel reservoir and an amount of fuel in the fuel reservoir may be determined from the weight. Other factors such as properties of the fuel (e.g., specific gravity, density, viscosity, etc.), temperature, time, pressure, and/or dimensions of the fuel reservoir container may be determined and an amount of fuel in a fuel reservoir may be determined based in part on one or more of these factors.

During dispensing, as fuel is delivered from one or more of the fuel reservoirs to a fuel delivery line, the amount of fuel delivered is measured via one or more meters. In addition, facility controller 5040 monitors amounts of fuel in fuel reservoirs 5010, 5020 via tank gauge 5030, which includes sensors 5011, 5021.

In some implementations, measurements from the sensors may be analyzed, such as using statistical analysis techniques. Statistical analysis may increase an accuracy of measurements. For example, some sensors may have an accuracy of approximately ±1 gallon and statistical analysis of measurements may increase the accuracy. As an example, various statistical methods, such as regression analysis (e.g., least squares estimation), or optimization methods, such as using Lagrange multipliers, may be used. In particular implementations, Statistical Inventory Reconciliation (SIR) or Electronic Capture Statistical Inventory Reconciliation (ESIR), which are available from Warren Rogers Associates, Inc. of Middletown, R.I., may be used. Factors such as properties of the fuel, temperature, time, pressure, fuel reservoir container dimensions, and/or sales data may be used in the statistical analysis to increase the accuracy of measurements.

In some implementations, sensors 5011, 5021 may monitor an amount of fuel in a fuel reservoir (e.g., periodically; aperiodically; continuously; before, during, or after performing specified operations such as delivering fuel to a fuel dispenser; and/or independent of operations of a fuel dispenser). Statistical analysis may be performed on data obtained from monitoring fuel amounts in a fuel reservoir. Since the sensors 5011, 5021 may have a large margin of error, the results from the statistical analysis may provide one or more adjustments to decrease the margin of error. Adjustments may correspond to certain measurements by the sensors. For example, a sensor may provide more accurate measurements of a tank when measuring at one level when compared to another level. Thus, different adjustments may correspond to measurements obtained at different fuel levels. As another example, an appropriate adjustment may vary with one or more of the tank dimensions (e.g., along a height of a tank). As another example, a sensor may provide more accurate measurements in specified temperature ranges. Thus, different adjustments may correspond to measurements obtained at different temperatures. The adjustments may be stored in a memory of the fuel dispenser and/or in the facility controller. The adjustments may be, for example, periodically updated (e.g., statistical analysis may be performed on data from monitoring an amount of fuel in a fuel reservoir); aperiodically updated; continuously updated; and/or updated once a day, once a week, twice a month, and/or after a specified number of gallons are dispensed (e.g., 50,000 gallons).

A fuel dispenser may be calibrated based at least in part on the adjustments. For example, an adjustment may be applied to measurements of fuel in a fuel reservoir, by a sensor, before and after delivery of fuel to a fuel dispenser; and, the adjusted measurements of fuel may be compared to the amount of fuel delivered as measured by the fuel dispenser to determine if calibration is appropriate and/or the adjustment required. As another example, an adjustment may correspond to a corrected measurement of an amount of fuel (e.g., a fuel dispenser may include a database of sensor measurements correlated corrected measurements). Thus, during calibration, corrected measurements may be retrieved based on corresponding sensor measurements and compared to the amount of fuel delivered as measured by the fuel dispenser.

Facility controller 5040 may determine whether meters 5051, 5052, 5061, 5062 of fuel dispensers 5050, 5060 should be adjusted. For example, facility controller 5040 may compare an amount of fuel in a fuel reservoir before and after dispensing fuel from a fuel dispenser to an amount of fuel dispensed, as measured by a meter of the fuel dispenser. If the difference in amount of fuel in a fuel reservoir before and after dispensing is not within an allowable tolerance of the measured amount of fuel dispensed, the fuel dispenser may be adjusted. For example, one or more meters of the fuel dispenser may be adjusted. A facility controller may send a command to the fuel dispenser in response to the calibration. For example, facility controller may transmit a program update to fuel dispensers 5050, 5060 based at least in part on the determined volume of fuel reservoirs 5010, 5020.

Figure 10:
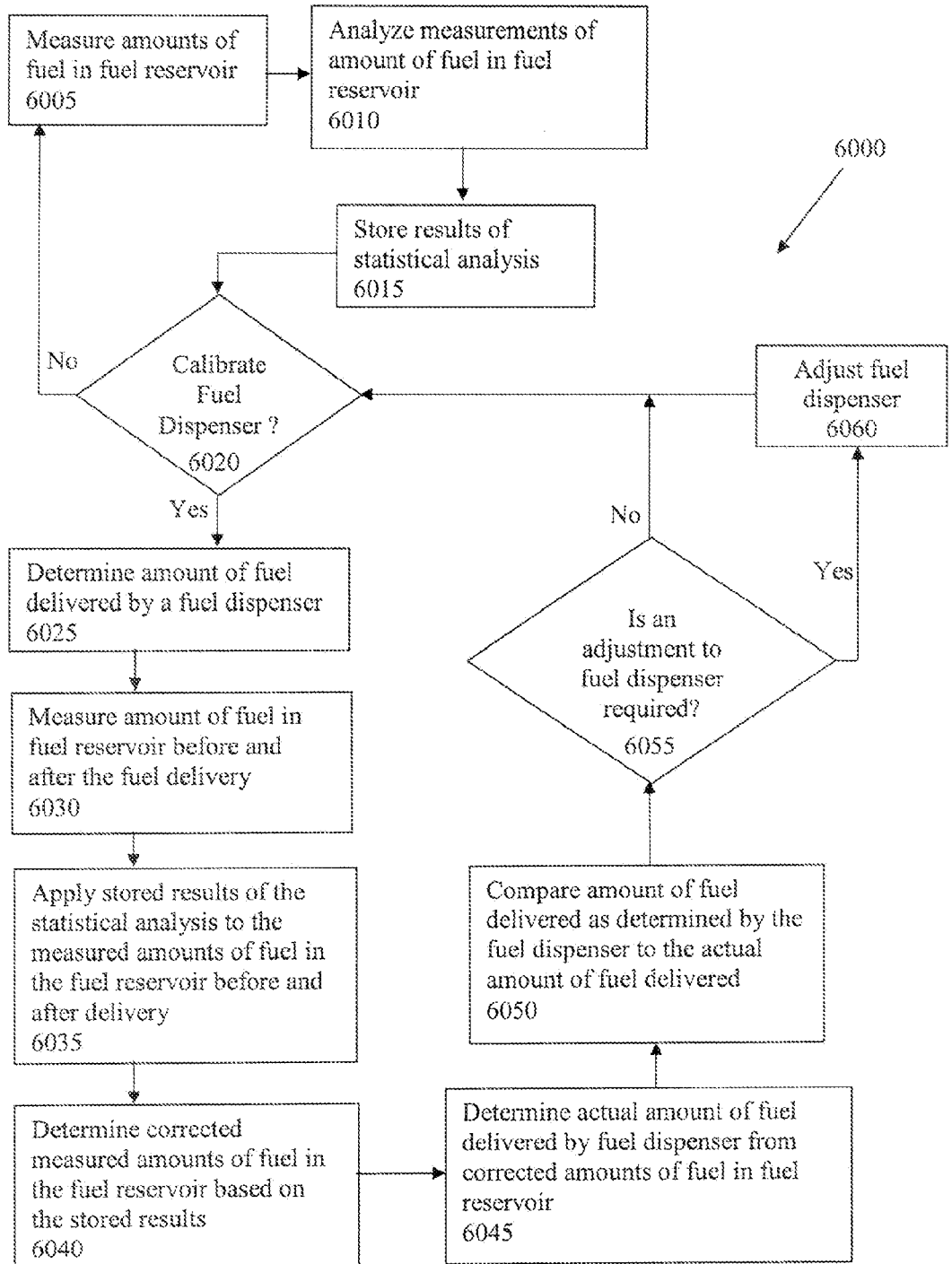
FIG. 10 is a flow chart illustrating an implementation of a calibration process performed by a retail fueling facility.

FIG. 10 illustrates an example of a process 6000 performed by retail fueling facility 5000. In process 6000, amounts of fuel in the fuel reservoir may be measured (operation 6005). For example, sensors may provide measurements of a fuel level in a fuel reservoir to a facility controller and/or a fuel dispenser. Fuel in the fuel reservoir may be measured periodically, continuously, or on another appropriate basis.

An analysis may be performed on the measurement of amounts of fuel in the fuel reservoir (operation 6010). For example, statistical analysis may be performed to increase the accuracy of the measurements from the sensors. Sensors may perform differently at different conditions (e.g., temperature, humidity, pressure, etc.) and analyzing the measurements may increase an accuracy of measurements. As another example, an accuracy of measurements from sensors and/or calculations of amount of fuel based on the sensor measurements may vary based on the fuel level in the fuel reservoir and/or over time (e.g., the tank may deform over time). Statistical analysis may allow adjustments (e.g., to account for changing accuracy based on fuel level, time, conditions such as temperature, type of fuel in fuel reservoir, etc.) to be made to the measurements obtained from the sensors and/or the amount of fuel determined from the sensor measurements.

The results (e.g., adjustments, tables correlating sensor measurements to corrected fuel amounts, etc.) of the statistical analysis may be stored (operation 6015). For example, the results may be stored in a memory of a fuel dispenser or a memory coupled to a fuel dispenser, such as a memory of the facility controller. The amounts of fuel in fuel reservoir, sensor readings, temperatures, pressures, humidity, and/or time of measurement may be stored.

A determination may be made whether to calibrate the fuel dispenser (operation 6020). For example, the facility controller may determine whether the fuel delivery measurement should be calibrated. The facility controller may determine whether a fuel delivery measurement should be calibrated based on the amount of time lapsed since the last calibration (e.g., fuel dispenser may be calibrated every 12 hours, daily, weekly, monthly, etc.). The facility controller and/or fuel dispenser may determine whether to calibrate one or more of the fuel dispensers in the retail fueling facility. In some implementations, a facility controller sends a command to the fuel dispenser to calibrate itself. If calibration of the fuel dispenser is not required, then fuel in the fuel reservoir may again be measured (operation 6005).

If calibration is required, then an amount of fuel delivered by the fuel dispenser may be determined (operation 6025). For example, during calibration, an amount of fuel delivered by a fuel dispenser may be measured by fuel dispenser meters. An amount of fuel delivered may be an aggregate of fuel delivered over a specified time period (e.g., a calibration period of 1 hour), a specified number of transactions (e.g., 10 fill-ups may be analyzed individually), and/or an aggregate of a specified number of transactions (e.g., 10 fill-ups may be analyzed as a whole).

The amount of fuel in the fuel reservoir before and after fuel delivery may be measured (operation 6030). For example, via sensors, a tank gauge may measure a fuel level in a fuel reservoir. The stored results from the statistical analysis may be applied to the measured amounts of fuel in the fuel reservoir before and after the delivery (operation 6035) and corrected measured amounts of fuel in the fuel reservoir may be determined based on the stored results (operation 6040). For example, a facility controller may include a database or table based on the statistical analysis correlating a sensor measurement to an appropriate adjustment to increase accuracy and/or to a corrected measurement. As another example, a facility controller or a fuel dispenser may determine an amount of fuel in the fuel reservoir based on the measurements obtained from a tank gauge and adjustments from the stored results.

The actual amount of fuel delivered by the fuel dispenser may be determined from the corrected amounts of fuel in the fuel reservoir (operation 6045). For example, an actual amount of fuel delivered may be the difference between amounts of fuel in the fuel reservoir before and after fuel was delivered by the fuel dispenser.

The amount of fuel delivered as determined by the fuel dispenser may be compared to the actual amount of fuel delivered (operation 6050). For example, the amount of fuel delivered by a fuel dispenser may be measured by one or more meters and transmitted to and/or stored in the facility controller.

A determination may be made whether an adjustment to the fuel dispenser is required (operation 6055). For example, if a measured amount of fuel delivered deviates from an actual amount of fuel delivered more than an allowable tolerance (e.g., 1%, 0.5%, 0.1%, etc.), a fuel dispenser may be adjusted (e.g., by adjusting a meter of the fuel dispenser) (operation 6070). If a measured amount of fuel delivered is within an allowable tolerance of the actual amount of fuel delivered, the fuel dispenser may not be adjusted, and a determination may be made again whether to calibrate the fuel dispenser (operation 6020).

If an adjustment to the fuel dispenser is required, the fuel dispenser may be adjusted (operation 6060). For example, a facility controller may send a command to the fuel dispenser, in response to the calibration, to adjust the fuel dispenser. For instance, if a pulse based meter is used in a fuel dispenser, the value of pulses may be reprogrammed (e.g., 1701 pulses per gallon may be adjusted to 1697 pulses per gallon). A facility controller may transmit a program update to adjust the fuel dispenser based at least in part on the difference between the measured amount of fuel delivered and the actual amount of fuel delivered.

In some implementations, an adjustment to a fuel dispenser may be based on calibration performed over a specified time period (e.g., a calibration period of 1 hour), a specified number of transactions (e.g., 10 fill-ups may be analyzed individually), and/or an aggregate of a specified number of transactions (e.g., 10 fill-ups may be analyzed as a whole). For example, adjustments made to the fuel dispenser may be based at least in part on the determined adjustment for a period of time (e.g., an amount of fuel dispensed over 24 hours may be examined to determine the appropriate adjustment to the fuel dispenser). As another example, adjustments made to the fuel dispenser may be based at least in part on an average determined adjustment for 10 fill-ups analyzed individually.

In some implementations, an amount of fuel in the fuel reservoir may be compared to sales data and/or measured amounts of fuel delivered to determine whether the fuel dispenser should be adjusted. For example, if sales data and/or measured amounts of fuel delivered indicate a greater amount of fuel should reside in the fuel reservoir, an adjustment may be made to the fuel dispenser. In addition, if fuel from reservoirs is blended prior to delivery to a fuel line (e.g., to produce mid-grade fuel), the amount of fuel in the fuel reservoir, sales data, and/or measured amounts of fuel delivered may be analyzed to identify blending variations. A fuel dispenser may be adjusted if blending variations greater than an allowed tolerance (e.g., greater than 0.1%) exist.

In some implementations, more than one fuel dispenser may be in operation concurrently. A determination whether to adjust one of the fuel dispensers may be based at least in part on a comparison of an amount of fuel dispensed by fuel dispensers operating concurrently and the amount of fuel delivered from fuel reservoir(s).

Although process 6000 includes specific operations, additional operations may be added or deleted. For example, analysis results may not be stored and/or corrected measurements, corresponding to the measured amount of fuel in the reservoir and based at least in part on the statistical analysis, may be stored. The determined amounts of fuel delivered may then be compared to stored corrected measurements associated with the measured amount of fuel in the fuel reservoir. As another example, if an adjustment to the fuel dispenser is required, a program update may be transmitted to the fuel dispenser and/or a fuel dispenser may determine the appropriate correction. In addition, the results of the statistical analysis may include an adjustment, such as a correction factor or formula, that can be used in combination with sensor measurements to determine an amount of fuel in a fuel reservoir.

A number of implementations have been described, and various others have been mentioned or suggested. Furthermore, those skilled in the art will readily recognize that various additions, deletions, substitutions, and modifications may be made to the implementations while still achieving calibration of a fuel dispenser. Thus, it will be understood that the scope of protectable subject matter should be judged based on the following claims, which may include one or more aspects of one or more of the implementations. In addition, it is will be understood that the terminology used herein is for the purpose of describing particular implementations and is not intended to be limiting. As used in this specification, the singular forms "a", "an" and "the" include plural referents unless the content clearly indicates otherwise. Thus, for example, reference to "a fuel dispenser" includes a combination of two or more fuel dispensers and reference to "a fuel" includes mixture of fuels. Accordingly, other implementations are within the scope of the following claims.

What is claimed is:

1. A self-calibrating fuel dispenser comprising:
a fuel controller comprising:
one or more pumps configured to deliver fuel from one or more fuel reservoirs to a fuel delivery line; and
one or more meters configured to measure an amount of fuel delivered to the fuel delivery line;
a fuel calibration reservoir separate from the one or more fuel reservoirs and fluidly coupled to the fuel delivery line and at least one of the one or more fuel reservoirs through at least one of the one or more meters, the fuel calibration reservoir sized to contain only a fraction of a fuel volume containable in one of the one or more fuel reservoirs, at least a portion of the fuel calibration reservoir in or adjacent a housing of the self-calibrating fuel dispenser; and
a dispenser manager configured to control fuel delivery by the fuel controller, wherein the dispenser manager is further configured to determine whether the fuel delivery measurement should be calibrated based at least in part on a deviation between a measured amount of fuel contained within the calibration reservoir and the amount of fuel delivered to the fuel delivery line measured by the one or more meters.

2. The fuel dispenser of claim 1, wherein the dispenser manager is configured to adjust the measurement of the amount of fuel delivered by the fuel controller to adjust the fuel dispenser.

3. The fuel dispenser of claim 1, wherein the dispenser manager is configured to determine whether a triggering event has occurred to determine whether the fuel dispenser should be calibrated.

4. The fuel dispenser of claim 3, wherein the triggering event comprises the fuel controller delivering a predetermined amount of fuel.

5. The fuel dispenser of claim 3, wherein the triggering event comprises passage of a predetermined amount of time from a previous calibration.

6. The fuel dispenser of claim 1, wherein the calibration reservoir is completely enclosed within the housing of the fuel dispenser containing at least one of the one or more pumps or a portion of the fuel delivery line.

7. The fuel dispenser of claim 1, wherein the dispenser manager is further configured to determine an adjustment to the fuel controller based on the deviation.

8. The fuel dispenser of claim 1, wherein the dispenser manager is further configured to obtain a program update configured to decrease the deviation between the amount of fuel measured by one or more of the meters and the delivered amount of fuel.

9. The fuel dispenser of claim 8, wherein the dispenser manager adjusts the fuel controller in response to the program update to adjust the fuel dispenser.

10. The fuel dispenser of claim 8, wherein the dispenser manager is configured to obtain the program update from a remote system.

11. The fuel dispenser of claim 1, wherein the dispenser manager is further configured to determine whether adjustment of the fuel dispenser is required in response to the calibration, and to adjust the fuel dispenser if adjustment is required.

12. The fuel dispenser of claim 1, wherein the dispenser manager is further configured to receive a calibration adjustment from a facility controller.

13. The fuel dispenser of claim 1, wherein the fuel calibration reservoir is sized to contain no more than approximately one gallon of fuel.

14. A method performed by a fuel dispenser comprising at least one processor, the method comprising:
    delivering an amount of fuel to a calibration reservoir of the fuel dispenser through a fuel delivery line fluidly coupled to one or more fuel reservoirs, the calibration reservoir in or adjacent the fuel dispenser and sized to contain only a fraction of a fuel volume containable in one of the one or more fuel reservoirs;
    measuring the amount of fuel delivered through the fuel delivery line to the calibration reservoir using one or more meters in fluid communication with the fuel delivery line;
    measuring an amount of fuel contained in the calibration reservoir subsequent to the delivery of the fuel to the calibration reservoir;
    determining, by the processor, whether a fuel delivery measurement of the fuel dispenser should be calibrated based at least in part on a deviation between the amount of fuel delivered to the calibration reservoir by the fuel dispenser measured by the one or more meters and the measured amount of fuel contained in the calibration reservoir; and
    adjusting, by the processor, the fuel dispenser in response to the calibration.

15. The method of claim 14, wherein determining, by the processor, whether a fuel delivery measurement of a fuel dispenser should be calibrated comprises determining, by the processor, whether a triggering event has occurred.

16. The method of claim 14, wherein adjusting, by the processor, the fuel dispenser comprises adjusting, by the processor, the measurements of the amount of fuel delivered by a fuel controller.

17. The method of claim 14, further comprising adjusting, by the processor, the fuel delivery measurement if the amount of fuel measured by one or more of the meters during calibration is not in a predetermined range of the amount of fuel delivered to the calibration reservoir during calibration.

18. The method of claim 14, further comprising:
    obtaining a program update configured to decrease the deviation between the fuel delivery measurement and the actual amount of delivered fuel; and
    adjusting, by the processor, the fuel dispenser based at least partially on the update.

19. The method of claim 18, wherein adjusting, by the processor, the fuel dispenser based at least partially on the update comprises adjusting a fuel controller in response to the program update.

20. The method of claim 14, further comprising:
    determining, by the processor, whether adjustment of the fuel dispenser is required in response to the calibration; and
    adjusting the fuel dispenser if adjustment is required.

21. The method of claim 14 receiving a calibration adjustment from a facility controller.

22. A self-calibrating fueling facility comprising:
    one or more fuel reservoirs;
    one or more calibration reservoirs, each comprising a tank and scale configured to measure an amount of fuel contained in the calibration reservoir, the tank sized to only contain a fraction of a fuel volume containable in one of the one or more fuel reservoirs;
    one or more fuel dispensers comprising:
        one or more pumps configured to deliver fuel from one or more of the fuel reservoirs to a fuel delivery line in fluid communication with the one or more calibration reservoirs;
        one or more meters configured to measure an amount of fuel delivered through the fuel delivery line to the one or more calibration reservoirs;
        a dispenser manager configured to control fuel delivery by the one or more pumps; and
        a housing configured to enclose at least a portion of the one or more pumps, one or more meters, the dispenser manager, and at least a portion of the tank; and
    a facility controller configured to determine whether a fuel delivery measurement should be calibrated based at least in part on a deviation between the amount of fuel delivered to the one or more calibration reservoirs measured by the one or more meters and the measured amount of fuel contained in the one or more calibration reservoirs, and send a command to the one or more fuel dispensers in response to the calibration.

23. The facility of claim 22, further comprising sensors coupled to one or more of the fuel reservoirs, wherein the sensors are configured to measure an amount of fuel in one or more of the fuel reservoirs.

24. The facility of claim 22, wherein the facility controller is further operable to determine an amount of fuel in one or more of the fuel reservoirs, and wherein the facility controller calibrates the fuel dispenser by:
    measuring an amount of fuel delivered by at least one of the fuel dispensers;
    determining an amount of fuel delivered from one or more of the fuel reservoirs to the fuel dispenser(s) based on the determined amounts of fuel in the fuel reservoir(s);
    comparing the measured amount of fuel delivered by the fuel dispenser(s) to the determined amount of fuel delivered;
    determining the deviation based on the comparison; and
    determining if the fuel delivery measurement of at least one of the fuel dispensers should be adjusted based on the deviation.

25. The method of claim 24, wherein determining the amount of fuel in one or more of the fuel reservoirs includes measuring an amount of fuel in one or more of the fuel reservoirs before and after delivering the amount of fuel.

26. The method of claim 24, wherein the facility controller is operable to analyze data from sensors coupled to one or more of the fuel reservoirs to determine an amount of fuel in one or more of the fuel reservoirs.

27. The method of claim 24, wherein the facility controller performs a calibration.

28. The self-calibrating fueling facility of claim 22, wherein the housing is configured to completely enclose the tank.

* * * * *